US012603303B2

(12) United States Patent     (10) Patent No.:   US 12,603,303 B2

Aono et al.     (45) Date of Patent:   Apr. 14, 2026

(54) FUEL CELL STACK

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP); Naohiro Matsubara, Takahama (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 576 days.

(21) Appl. No.: 18/173,481

(22) Filed: Feb. 23, 2023

(65) Prior Publication Data

US 2023/0282841 A1    Sep. 7, 2023

(30) Foreign Application Priority Data

Mar. 4, 2022   (JP) ................................. 2022-033388

(51) Int. Cl.
   *H01M 8/026*      (2016.01)
   *H01M 8/0254*     (2016.01)
   (Continued)

(52) U.S. Cl.
   CPC ......... *H01M 8/026* (2013.01); *H01M 8/0254* (2013.01); *H01M 8/0258* (2013.01); (Continued)

(58) Field of Classification Search
   CPC .. H01M 8/026; H01M 8/0258; H01M 8/0267; H01M 8/04007; H01M 8/2483; H01M 8/241; H01M 8/0254; H01M 2008/1095; H01M 8/0273; H01M 8/2457; Y02E 60/50
See application file for complete search history.

(56) References Cited

U.S. PATENT DOCUMENTS

2010/0035122 A1   2/2010   Yamamoto et al.
2013/0252130 A1   9/2013   Ishida et al.
          (Continued)

FOREIGN PATENT DOCUMENTS

JP     2001-291522 A    10/2001
JP     2009-129813 A    6/2009
          (Continued)

OTHER PUBLICATIONS

Office Action in counterpart Japanese Patent Application No. 2022 033388, dated Jul. 1, 2025, and translation thereof.

*Primary Examiner* — Eugenia Wang

(74) *Attorney, Agent, or Firm* — Greenblum & Bernstein, P.L.C.

(57)          ABSTRACT

A fuel cell stack includes single cells stacked in a first direction. Each single cell includes a power generating unit, a first separator, and a second separator. The first separator and the second separator hold the power generating unit between the first separator and the second separator. The first separator of each single cell includes first protrusions that protrude toward the second separator of another single cell that is adjacent in the first direction. The first protrusions are in contact with the second separator. Each of the first protrusions includes a top wall portion and two side wall portions. At least one of the two side wall portions includes a step portion having a shape of a step in the first direction.

13 Claims, 3 Drawing Sheets

(51) Int. Cl.

| | |
|---|---|
| *H01M 8/0258* | (2016.01) |
| *H01M 8/0267* | (2016.01) |
| *H01M 8/0273* | (2016.01) |
| *H01M 8/04007* | (2016.01) |
| *H01M 8/10* | (2016.01) |
| *H01M 8/2483* | (2016.01) |

(52) U.S. Cl.
CPC ..... *H01M 8/0267* (2013.01); *H01M 8/04007* (2013.01); *H01M 8/2483* (2016.02); *H01M 8/0273* (2013.01); *H01M 2008/1095* (2013.01)

(56) References Cited

U.S. PATENT DOCUMENTS

| | | | |
|---|---|---|---|
| 2019/0237775 A1 * | 8/2019 | Shibata | ............... H01M 8/0254 |
| 2020/0153000 A1 | 5/2020 | Stöhr et al. | |

FOREIGN PATENT DOCUMENTS

| | | |
|---|---|---|
| JP | 2013-201091 A | 10/2013 |
| JP | 2020-522089 A | 7/2020 |

* cited by examiner 41 (91)   48B   60   40b   48A   40B   48a   40 (90)   45 (95)

44 (94)

46 (96)

47B 47B 60   47A   40A   40a   48B 43 (93)

42 (92)

21 (91)   11   10 (90)   20 (90)   25 (95)

24 (94)

27

26 (96)

23 (93)

22 (92)

12

31 (91)   37B   50   30a   30A   37A   38B   30 (90)   35 (95)

34 (94)

36 (96)

33 (93)

32 (92)

38B   50   38A   30b   38a   37B

30B

FUEL CELL STACK

BACKGROUND

1. Field

The present disclosure relates to a fuel cell stack.

2. Description of Related Art

Japanese National Phase Laid-Open Patent Publication No. 2020-522089 discloses a fuel cell stack. The fuel cell stack includes multiple single cells stacked together. Each single cell includes two separators. A membrane electrode assembly and two gas diffusion layers, which sandwich the membrane electrode assembly in the stacking direction of the single cells, are disposed between the two separators.

Each separator includes a facing surface, which faces a gas diffusion layer. The facing surface has groove-shaped passages for conducting a reaction medium. Each separator includes groove-shaped passages in an opposite surface located on a side opposite to the facing surface. The passages in the opposite surfaces of single cells adjacent to each other form cavities between the separators. The cavities conduct a cooling medium.

Each separator includes a protruding bead and a recess portion on the facing surface. The recess portion is disposed between the bead and a passage.

The bead is provided over the entire periphery of the passages.

The bottom walls of the recess portions formed in the respective separators are in contact with each other (refer to FIG. 6A of Japanese National Phase Laid-Open Patent Publication No. 2020-522089).

In the fuel cell stack including such separators, the recess portions in contact with each other prevent the cooling medium flowing through the cavity from flowing toward the bead. That is, the recess portions prevent the so-called side flows.

In such a fuel cell stack, the depths of the recess portions of the separators vary. That is, the recess portions include relatively deep ones and relatively shallow ones. A gap is likely to be created between the bottom walls of relatively shallow recess portions. As a result, cooling medium that flows sideways from the cavity leaks out through the gap, reducing the side flow limiting effect of the recess portions. This may reduce the cooling efficiency of the cooling medium and thus reduce the power generation efficiency of the fuel cell.

SUMMARY

Accordingly, it is an objective of the present disclosure to provide a fuel cell stack capable of limiting side flows of a cooling medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel cell stack including single cells stacked in a first direction is provided. Each single cell includes a power generating unit, a first separator, and a second separator. The first separator and the second separator hold the power generating unit between the first separator and the second separator. The first separator and the second separator each include a facing surface that faces the power generating unit, and an opposite surface that is located on a side opposite to the facing surface. The opposite surface of the first separator and the opposite surface of the second separator are each provided with groove passages that extend in a second direction, a cooling medium flowing through the groove passages. The first separator of each single cell includes first protrusions that protrude toward the second separator of another single cell that is adjacent in the first direction. The first protrusions are in contact with the second separator. The groove passages include groove passages that are located at outermost positions in a third direction. The third direction intersect with both of the first direction and the second direction. The first protrusions are provided on an outer side of at least one of the groove passages that are located at the outermost positions in the third direction. The first protrusions are arranged side by side in the second direction. Each of the first protrusions includes a top wall portion and two side wall portions located on opposite sides of the top wall portion in the second direction. At least one of the two side wall portions includes a step portion having a shape of a step in the first direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
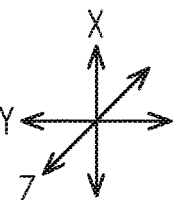
FIG. 1 is an exploded perspective view of a single cell for a fuel cell stack according to each embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Fuel cell stacks according to respective embodiments will now be described with reference to FIGS. 1 to 4. For illustrative purposes, some parts of the structures in the drawings are exaggerated or simplified, and the dimensional ratios of the structures may be different from the actual ratios. The term "orthogonal" is not necessarily used in a strict sense, but may be used in cases where elements are generally orthogonal to each other within ranges in which such configuration achieves the operational advantages of the respective embodiments.

First Embodiment

First the fuel cell stack according to the first embodiment will be described with reference to FIGS. 1 to 3.

Figure 2:
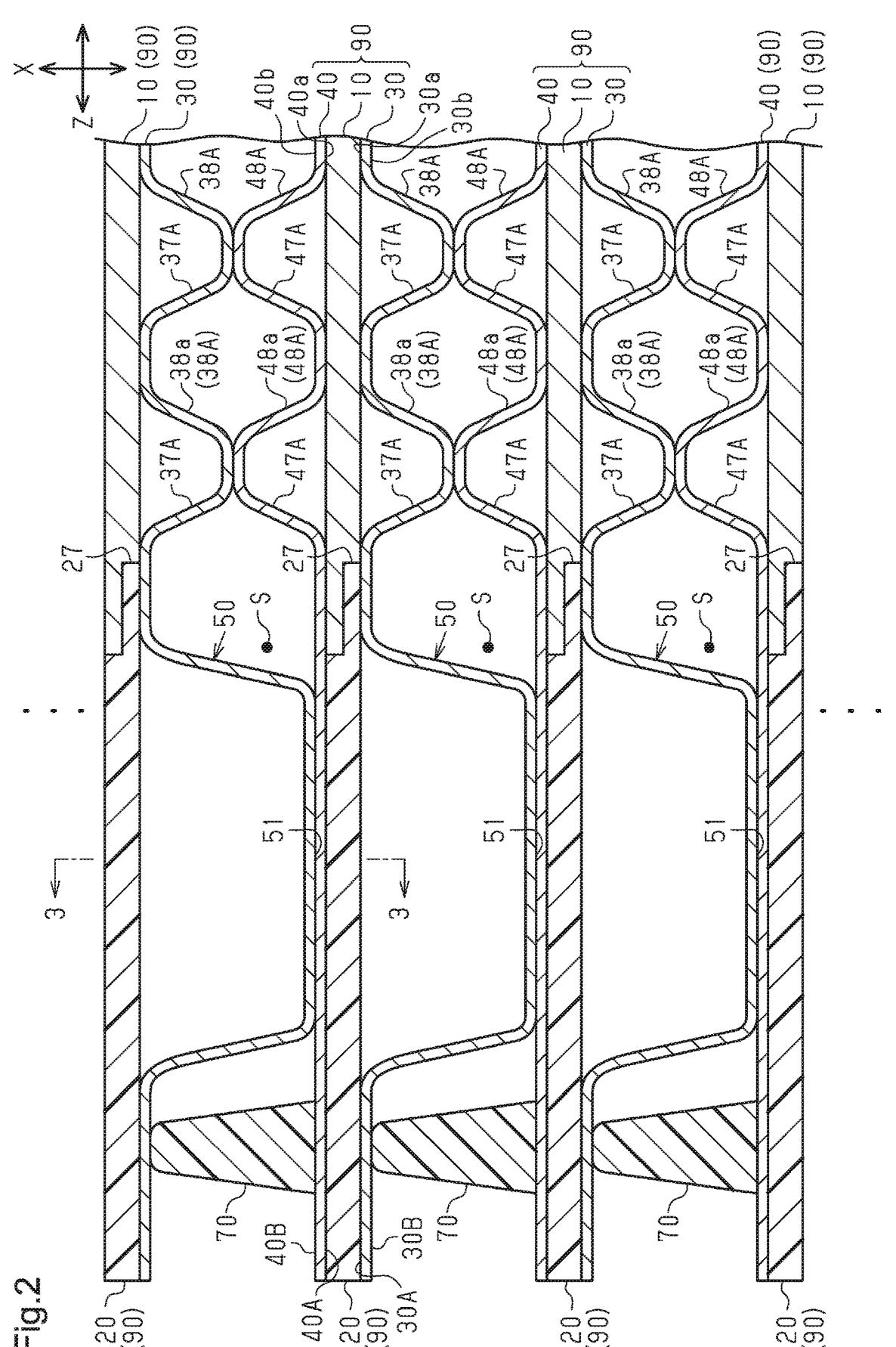
FIG. 2 is a cross-sectional view showing the fuel cell stack according to a first embodiment.

As shown in FIGS. 1 and 2, the fuel cell stack is formed by stacking multiple single cells 90 each having a rectangular plate-shape as a whole.

In the following description, the direction in which the single cells 90 are stacked will be referred to as a first direction X. Among directions orthogonal to the first direction X, a longitudinal direction of the single cell 90 will be referred to as a second direction Y. Also, a direction that is orthogonal to both the first direction X and the second direction Y will be referred to as a third direction Z.

The single cell 90 has inlet manifolds 91, 93, 95 for introducing reactant gas or cooling medium into the single cell 90 and outlet manifolds 92, 94, 96 for discharging the reactant gas and the cooling medium in the single cell 90 to the outside. In the present embodiment, the inlet manifold 91 and the outlet manifold 92 are manifolds through which fuel gas flows. The fuel gas is, for example, hydrogen gas. The inlet manifold 93 and the outlet manifold 94 are manifolds through which cooling medium flows. The cooling medium is, for example, coolant. The inlet manifold 95 and the outlet manifold 96 are manifolds through which oxidant gas flows. The oxidant gas is, for example, air.

The inlet manifolds 91, 93, 95 and the outlet manifolds 92, 94, 96 each have a rectangular shape in plan view, and extend in the first direction X through the single cell 90.

The inlet manifold 91 and the outlet manifolds 94, 96 are located on a first side in the second direction Y of the single cell 90 (on the left side in the left-right direction in FIG. 1). The inlet manifold 91 and the outlet manifolds 94, 96 are arranged in that order from a first side in the third direction Z (the back side of the sheet of FIG. 1) toward a second side in the third direction Z (the front side of the sheet of FIG. 1).

The outlet manifold 92 and the inlet manifolds 93, 95 are located on a second side in the second direction Y of the single cell 90 (on the right side in the in FIG. 1). The outlet manifold 92 and the inlet manifolds 93, 95 are arranged in that order from the second side in the third direction Z (the front side of the sheet of FIG. 1) toward the first side in the third direction Z (the back side of the sheet of FIG. 1).

The single cell 90 includes a membrane electrode assembly 10 (hereinafter, referred to as MEA 10), a frame member 20, which holds the MEA 10, a first separator 30, and a second separator 40. The separators 30, 40 hold the MEA 10 and the frame member 20 between them.

Each component will now be described.

<MEA 10>

As shown in FIG. 1, the MEA 10 includes a solid polymer electrolyte membrane (not shown; hereinafter referred to as an electrolyte membrane) and electrodes 11, 12 respectively provided on opposite surfaces of the electrolyte membrane. In the present embodiment, the electrode that is joined to a first side in the first direction X (the upper side in the up-down direction in FIG. 1) of the electrolyte membrane is a cathode 11. Also, the electrode joined to a second side in the first direction X (the lower side in the in FIG. 1) of the electrolyte membrane is an anode 12.

The electrodes 11, 12 each include a catalyst layer (not shown) joined to the electrolyte membrane and a gas diffusion layer (not shown), which is joined to the catalyst layer.

The MEA 10 corresponds to a power generating unit of the fuel cell according to the present disclosure.

<Frame Member 20>

As shown in FIGS. 1 and 2, the frame member 20 has a rectangular shape elongated in the second direction Y and is made of, for example, plastic.

The frame member 20 includes through-holes 21, 22, 23, 24, 25, 26, which are respective parts of the manifolds 91, 92, 93, 94, 95, 96.

The frame member 20 includes an opening 27 in a center. The MEA 10 is joined to the peripheral edge of the opening 27 from the first side in the first direction X (upper side as viewed in FIG. 1).

<First Separator 30>

As shown in FIGS. 1 and 2, the first separator 30 is formed by pressing, for example, a metal member that is made of titanium or stainless steel and has a rectangular shape in plan view.

The first separator 30 includes through-holes 31, 32, 33, 34, 35, 36, which are respective parts of the manifolds 91, 92, 93, 94, 95, 96.

The first separator 30 includes a first surface 30A and a second surface 30B. The first surface 30A includes a facing surface 30a, which faces the anode 12 of the MEA 10 in the first direction X. The second surface 30B includes an opposite surface 30b, which is located on a side opposite to the facing surface 30a.

The first surface 30A is provided with groove passages 37A, through which the fuel gas flows, and two connecting portions 37B. In FIG. 1, the groove passages 37A and the connecting portions 37B are illustrated in a simplified manner.

The groove passages 37A are provided in the facing surface 30a. Each of the groove passages 37A extends linearly in the second direction Y (refer to FIG. 1). The groove passages 37A are arranged side by side in the third direction Z while being spaced apart from each other (refer to FIG. 2).

As shown in FIG. 1, the two connecting portions 37B respectively extend from the opposite sides of the groove passages 37A in the second direction Y toward the through-holes 31, 32. The fuel gas is introduced from the inlet manifold 91 to the groove passages 37A via one of the connecting portions 37B. The fuel gas flowing through the groove passages 37A is discharged to the outlet manifold 92 via the other connecting portion 37B.

As shown in FIGS. 1 and 2, the second surface 30B is provided with groove passages 38A and two connecting portions 38B, through which the cooling medium flows, and first protrusions 50. In FIG. 1, the groove passages 38A and the connecting portions 38B are illustrated in a simplified manner. In FIGS. 1 and 2, the first protrusions 50 are illustrated in a simplified manner.

The groove passages 38A are provided in the opposite surface 30b. Each of the groove passages 38A extends linearly in the second direction Y (refer to FIG. 1). The groove passages 38A are arranged side by side in the third direction Z while being spaced apart from each other (refer to FIG. 2).

As shown in FIG. 2, each groove passage 37A is formed by the back side of the protrusion positioned between two groove passages 38A adjacent to each other in the third direction Z. Also, each groove passage 38A is formed by the back side of the protrusion positioned between two groove passages 37A adjacent to each other in the third direction Z.

As indicated by broken lines in FIG. 1, the two connecting portions 38B respectively extend from the opposite sides of the groove passages 38A in the second direction Y toward the through-holes 33, 34. The cooling medium is introduced from the inlet manifold 93 to the groove passages 38A via one of the connecting portions 38B. The cooling medium flowing through the groove passages 38A is discharged to the outlet manifold 94 via the other connecting portion 38B.

<First Protrusions 50>

As shown in FIGS. 1 and 2, the first protrusions 50 are provided on the outer sides of two outer-side groove passages 38a, which are the outermost groove passages 38A in the third direction Z. In the present embodiment, the first protrusions 50 are provided on the outer sides of the respective outer-side groove passages 38a (refer to FIG. 1). The outer side in the third direction Z refers to a side away from the center of the single cell 90 in the third direction Z. FIG. 2 illustrates the outer-side groove passage 38a located on the first side in the third direction Z (the back side of the sheet of FIG. 1) of the two outer-side groove passages 38a and the first protrusions 50 located on the outer side of that outer-side groove passage 38a.

The first protrusions 50 protrude from each single cell 90 toward the second separator 40 of another single cell 90 that is adjacent in the first direction X (see FIG. 2).

The first protrusions 50 extend in the third direction Z.

As shown in FIG. 1, the first protrusions 50 are arranged side by side in the second direction Y while being spaced apart from each other. The first protrusions 50 are provided over the entire range in which the outer-side groove passage 38a is formed in the second direction Y.

Figure 3:
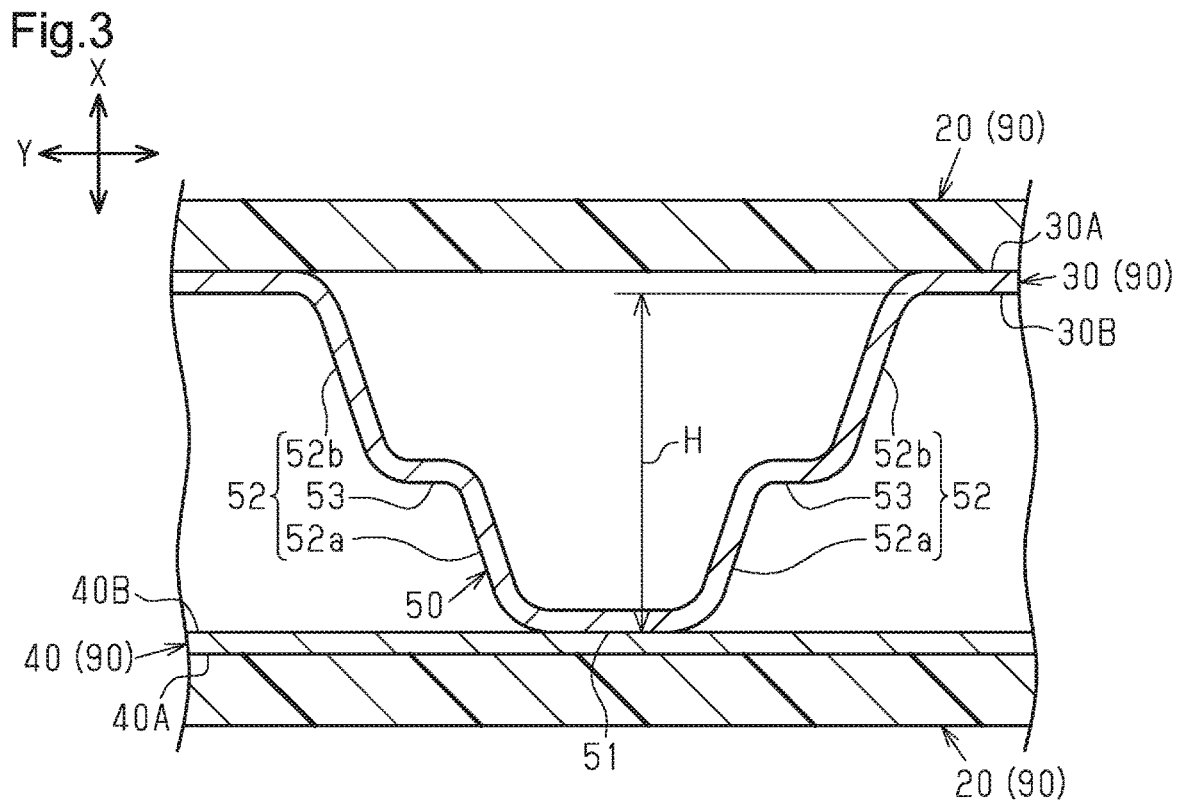
FIG. 3 is a cross-sectional view taken along line 3-3 of FIG. 2.

As shown in FIG. 3, each of the first protrusions 50 includes a first top wall portion 51 and two first side wall portions 52 located on opposite sides of the first top wall portion 51 in the second direction Y.

The first top wall portions 51 of each single cell 90 are in contact with the second surface 40B of the second separator 40 of another single cell 90 that is adjacent in the first direction X.

Each first side wall portion 52 includes a first step portion 53 having the shape of a step in the first direction X. In the present embodiment, the two first side wall portions 52 each include a first step portion 53.

The first step portion 53 is located at a center of the first side wall portion 52 in the first direction X. Each first side wall portion 52 includes a portion located closer to the first top wall portion 51 than the first step portion 53 in the first direction X (hereinafter, referred to as a distal portion 52a), and a portion located closer to the proximal end of the first protrusion 50 than the first step portion 53 in the first direction X (hereinafter, referred to as a proximal portion 52b).

The distal portion 52a is located closer to the center of the first protrusion 50 than the proximal portion 52b in the second direction Y.

<Second Separator 40>

As shown in FIGS. 1 and 2, the second separator 40 is formed by pressing, for example, a metal member that is made of titanium or stainless steel and has a rectangular shape in plan view.

The second separator 40 includes through-holes 41, 42, 43, 44, 45, 46, which are respective parts of the manifolds 91, 92, 93, 94, 95, 96.

The second separator 40 includes a first surface 40A and a second surface 40B. The first surface 40A includes a facing surface 40a, which faces the cathode 11 of the MEA 10 in the first direction X. The second surface 40B includes an opposite surface 40b, which is located on a side opposite to the facing surface 40a.

The first surface 40A is provided with groove passages 47A and two connecting portions 47B, through which the oxidant gas flows. In FIG. 1, the groove passages 47A and the connecting portions 47B are illustrated in a simplified manner.

The groove passages 47A are provided in the facing surface 40a. Each of the groove passages 47A extends linearly in the second direction Y (refer to FIG. 1). The groove passages 47A are arranged side by side in the third direction Z while being spaced apart from each other (refer to FIG. 2).

As indicated by broken lines in FIG. 1, the two connecting portions 47B respectively extend from the opposite sides of the groove passages 47A in the second direction Y toward the through-holes 45, 46. The oxidant gas is introduced from the inlet manifold 95 to the groove passages 47A via one of the connecting portions 47B. The oxidant gas flowing through the groove passages 47A is discharged to the outlet manifold 96 via the other connecting portion 47B.

As shown in FIGS. 1 and 2, the second surface 40B is provided with groove passages 48A and two connecting portions 48B, through which the cooling medium flows. In FIG. 1, the groove passages 48A and the connecting portions 48B are illustrated in a simplified manner.

The groove passages 48A are provided in the opposite surface 40b. Each of the groove passages 48A extends linearly in the second direction Y (refer to FIG. 1). The groove passages 48A are arranged side by side in the third direction Z while being spaced apart from each other (refer to FIG. 2).

The groove passages 48A include two outer-side groove passages 48a, which are the outermost groove passages 48A in the third direction Z.

As shown in FIG. 2, each groove passage 47A is formed by the back side of the protrusion positioned between two groove passages 48A adjacent to each other in the third direction Z. Also, each groove passage 48A is formed by the back side of the protrusion positioned between two groove passages 47A adjacent to each other in the third direction Z.

As shown in FIG. 1, the two connecting portions 48B respectively extend from the opposite sides of the groove passages 48A in the second direction Y toward the through-holes 43, 44. The cooling medium is introduced from the inlet manifold 93 to the groove passages 48A via one of the connecting portions 48B. The cooling medium flowing through the groove passages 48A is discharged to the outlet manifold 94 via the other connecting portion 48B.

As shown in FIG. 2, a gasket 70 is provided on the outer side of the first protrusions 50 in the third direction Z. The gasket 70 provides a seal between the separator 30 of the single cell 90 and the second separator 40 of another single cell 90 that is adjacent in the first direction X. The first protrusions 50 are configured to partially fill a space S formed between the gasket 70 and the outer-side groove passages 38a, 48a in the third direction Z.

Operation of the first embodiment will now be described.

The fuel cell stack includes the single cells 90, which are fastened together in the first direction X. If the length of the first protrusions 50 in the first direction X varies, that is, if the height H (see FIG. 3) of the first protrusions 50 varies, the first protrusions 50 include relatively high ones and relatively low ones. A gap is likely to be created between a relatively low first protrusion 50 of each single cell 90 and the second separator 40 of another single cell 90 that is adjacent in the first direction X.

In this regard, when the first protrusions 50 are pressed against the second separator 40 in the present embodiment, the first step portions 53 of the first side wall portions 52 of a relatively high first protrusion 50 are smoothly deformed to bend in the first direction X. As a result, the height H of the relatively high first protrusions 50 is reduced. Therefore, a gap is unlikely to be formed between a relatively low first protrusion 50 and the second separator 40. Accordingly, the cooling medium is unlikely to flow to the outside of the first protrusions 50 through gaps. This limits side flows of the cooling medium.

The first embodiment has the following advantages.

(1-1) The first separator 30 of each single cell 90 includes the multiple first protrusions 50. The first protrusions 50 protrude toward the second separator 40 of another single cell 90 that is adjacent in the first direction X, and abut the second separator 40. The first protrusions 50 are provided on the outer sides of two of the outer-side groove passages 38a, which are located on the outermost positions in the third direction Z. The first protrusions 50 are arranged side by side in the second direction Y. Each of the first protrusions 50 includes a first top wall portion 51 and two first side wall portions 52 located on opposite sides of the first top wall portion 51 in the second direction Y. The two first side wall portion 52 each include a first step portion 53 having the shape of a step in the first direction X.

This configuration operates in the above-described manner. This limits side flows of the cooling medium.

(1-2) The first protrusions 50 are provided over the entire range in which the outer-side groove passage 38a is formed in the second direction Y.

With this configuration, the above-described advantage is achieved over the entire range in which the outer-side groove passages 38a are formed in the second direction Y. Accordingly, side flows of the cooling medium are further limited.

Second Embodiment

A fuel cell stack according to the second embodiment will now be described with reference to FIGS. 1 and 4. Differences from the first embodiment will mainly be discussed. The same reference numerals are given to those components of the fuel cell stack according to the second embodiment that are the same as or equivalent to the corresponding components of the fuel cell stack according to the first embodiment, and redundant explanations are omitted.

<Second Protrusions 60>

Figure 4:
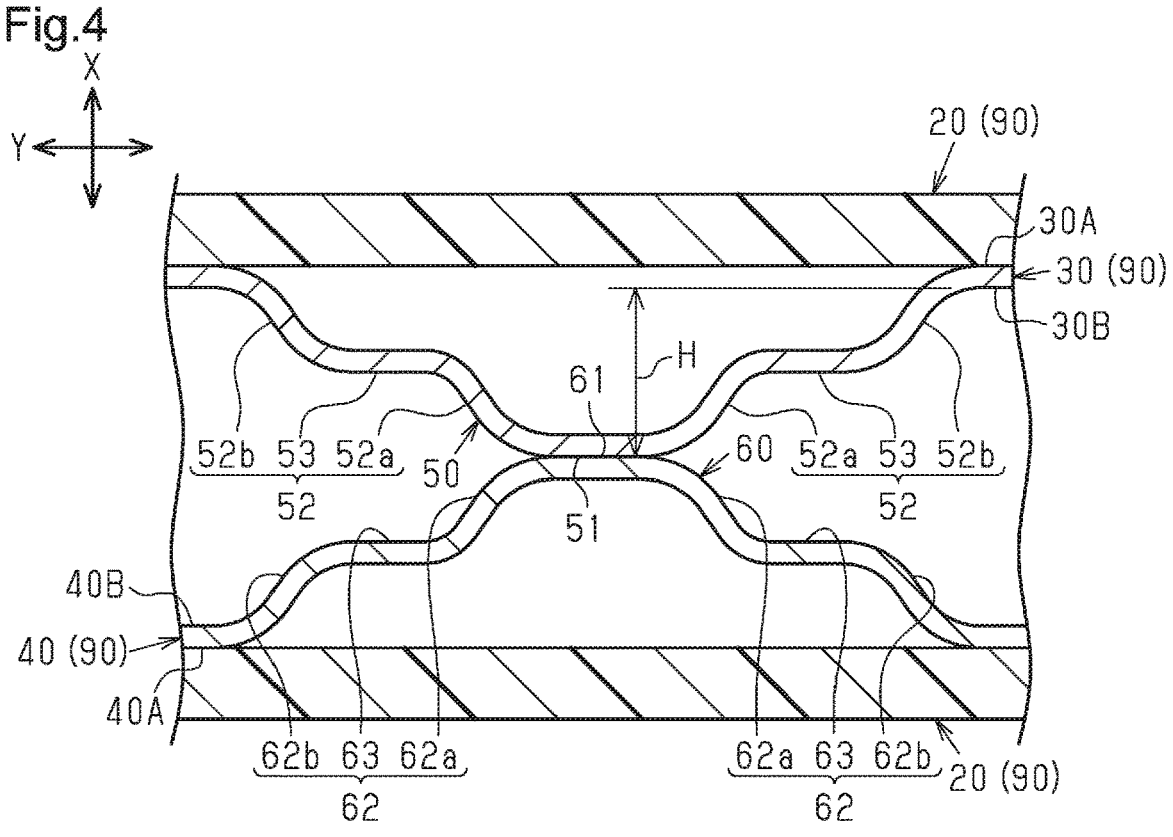
FIG. 4 is a cross-sectional view corresponding to FIG. 3, illustrating a fuel cell stack according to a second embodiment.

As shown in FIGS. 1 and 4, the second separator 40 includes second protrusions 60, which respectively protrude toward the first protrusions 50 in the first direction X.

The second protrusions 60 represented by the long-dash double-short-dash lines in FIG. 1 are provided on the outer sides of the two outer-side groove passages 48a. In the present embodiment, the second protrusions 60 are provided on the outer sides of the respective outer-side groove passages 48a.

The second protrusions 60 extend in the third direction Z.

The second protrusions 60 are arranged side by side in the second direction Y while being spaced apart from each other. The second protrusions 60 are provided over the entire range in which the outer-side groove passage 48a is formed in the second direction Y. In the present embodiment, the second protrusions 60 are provided at positions each corresponding to one of the first protrusions 50 in the first direction X.

As shown in FIG. 4, each of the second protrusions 60 includes a second top wall portion 61 and two second side wall portions 62 located on opposite sides of the second top wall portion 61 in the second direction Y.

The second top wall portion 61 is in contact with the first top wall portion 51 of the corresponding first protrusions 50.

Each second side wall portion 62 includes a second step portion 63 having the shape of a step in the first direction X. In the present embodiment, the two second side wall portions 62 each include a second step portion 63.

The second step portion 63 is located at a center of the second side wall portion 62 in the first direction X. Each second side wall portion 62 includes a portion located closer to the second top wall portion 61 than the second step portion 63 (hereinafter, referred to as a distal portion 62a), and a portion located closer to the proximal end of the second protrusion 60 than the second step portion 63 in the first direction X (hereinafter, referred to as a proximal portion 62b).

The distal portion 62a is located closer to the center of the second protrusion 60 than the proximal portion 62b in the second direction Y.

Operation of the second embodiment will now be described.

When the first protrusions 50 are pressed against the second protrusions 60, the first step portions 53 of the first side wall portions 52 of relatively high first protrusions 50 and the second step portions 63 of the second side wall portions 62 of relatively high second protrusions 60 are smoothly deformed to bend in the first direction X.

The second embodiment has the following advantages.

(2-1) The second separator 40 of each single cell 90 includes multiple second protrusions 60, which abut the first protrusions 50 of another single cell 90 that is adjacent. The second protrusions 60 each protrude toward the first protrusions 50 in the first direction X.

With this configuration, the height H of the first protrusions 50 can be reduced as compared with a case in which the second separator 40 does not include the second protrusions 60 (see FIGS. 3 and 4). Therefore, the first protrusions 50 are formed easily. Accordingly, the first separator 30 is manufactured easily.

(2-2) Each of the second protrusions 60 includes a second top wall portion 61 and two second side wall portions 62 located on opposite sides of the second top wall portion 61 in the second direction Y. The two second side wall portions 62 each include the second step portion 63 having the shape of a step in the first direction X.

This configuration operates in the above-described manner. Accordingly, it is possible to prevent the formation of a gap between the first protrusion 50 and the second protrusion 60 while limiting the amount of bending deformation of both the first step portions 53 of the first side wall portions 52 of the first protrusion 50 and the second step portions 63 of the second side wall portions 62 of the second protrusion 60.

(2-3) The second protrusions 60 are provided over the entire range in which the outer-side groove passage 48a is formed in the second direction Y.

With this configuration, the above-described advantage is achieved over the entire range in which the outer-side groove passages 48a are formed in the second direction Y. This further limits side flows of the cooling medium.

<Modifications>

The above-described embodiments may be modified as follows. The above-described embodiments and the following modifications can be combined as long as the combined modifications remain technically consistent with each other.

The shapes of the inlet manifolds 91, 93, 95 and the outlet manifolds 92, 94, 96 are not limited to rectangular shapes in plan view as in the above-described embodiments, but may be stadium shapes in plan view, for example.

The flows of the reactant gas and the cooling medium through the manifolds 91, 92, 93, 94, 95, 96 are not limited to those described in the above-described embodiments. For example, the manifold 96 may be used as an inlet manifold for the oxidant gas, and the manifold 95 may be used as an outlet manifold for the oxidant gas. Accordingly, the manifold 94 may be used as an inlet manifold for the cooling medium, and the manifold 93 may be used as an outlet manifold for the cooling medium. That is, the oxidant gas that flows through the groove passages 47A and the cooling medium that flows through the groove passages 38A, 48A may flow in the same direction as the fuel gas flowing through the groove passages 37A.

The groove passages 37A (38A) are not limited to extending linearly in the second direction Y as in the above-described embodiments. For example, the groove passages 37A (38A) may extend in wavy shapes in a planar direction of the facing surface 30a (the opposite surface 30b).

The groove passages 47A (48A) are not limited to extending linearly in the second direction Y as in the above-described embodiments. For example, the groove passages 47A (48A) may extend in wavy shapes in a planar direction of the facing surface 40a (the opposite surface 40b).

The shape of the first protrusions 50 is not limited to the one described in the above-described embodiments. For example, each first side wall portion 52 may be provided with two or more first step portions 53. In addition, the first protrusion 50 is not limited to the configuration in which the first step portion 53 is provided on each of the two first side wall portions 52. The first step portion 53 may be provided on only one of the first side wall portions 52.

The shape of the second protrusions 60 is not limited to the one described in the second embodiment. For example, each second side wall portion 62 may be provided with two or more second step portions 63. In addition, the second protrusion 60 is not limited to the configuration in which the second step portion 63 is provided on each of the two second side wall portions 62. The second step portion 63 may be provided on only one of the second side wall portions 62.

The second step portions 63 may be omitted from the second protrusions 60.

The first protrusions 50 do not necessarily need to be provided on the outer sides of the respective outer-side groove passages 38a as in the above-described embodiments. The first protrusions 50 may be provided on the outer side of one of the outer-side groove passages 38a. In this case, the second protrusions 60 are not limited to being provided on the outer sides of both of the outer-side groove passages 48a, and the arrangement thereof may be changed in accordance with the first protrusions 50.

The fuel cell stack is not limited to the one in which one second protrusion 60 is provided at a position corresponding to each of the first protrusions 50 in the first direction X as described in the second embodiment. Some of the second protrusions 60 may be omitted. In this case, the separator 30 includes first protrusions 50 that do not face the second protrusions 60 in the first direction X. The first protrusions 50 that do not face the second protrusions 60 may be any protrusion as long as they are in contact with the second surfaces 40B of the separator 40.

The separators 30, 40 do not necessarily need to be formed by pressing metal plates, but may be formed by cutting or etching.

The material for the separators 30, 40 is not limited to titanium or stainless steel, but may be aluminum or carbon.

The first separator according to the present disclosure is not limited to an anode-side separator as in the above-described embodiments, but may be used as a cathode-side separator. In this case, the second separator according to the present disclosure is used as an anode-side separator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell stack, comprising single cells stacked in a first direction, wherein
   each single cell includes:
   a power generating unit; and
   a first separator and a second separator that hold the power generating unit between the first separator and the second separator,
   the first separator and the second separator each include:
   a facing surface that faces the power generating unit; and
   an opposite surface that is located on a side opposite to the facing surface, the opposite surface of the first separator and the opposite surface of the second separator are each provided with groove passages that extend in a second direction, a cooling medium flowing through the groove passages,
   the first separator of each single cell includes first protrusions that protrude toward the second separator of another single cell that is adjacent in the first direction, the first protrusions being in contact with the second separator,
   the groove passages include groove passages that are located at outermost positions in a third direction, the third direction intersecting with both of the first direction and the second direction,
   the first protrusions are provided on an outer side of at least one of the groove passages that are located at the outermost positions in the third direction, the first protrusions being arranged side by side in the second direction,
   each of the first protrusions includes a top wall portion and two side wall portions located on opposite sides of the top wall portion in the second direction, and
   at least one of the two side wall portions includes a step portion having a shape of a step in the first direction.
2. The fuel cell stack according to claim 1, wherein the first protrusions are provided over an entire range in which the groove passages are formed in the second direction.
3. The fuel cell stack according to claim 1, wherein
   the second separator of each single cell includes second protrusions that are in contact with the first protrusions of another single cell that is adjacent, and the second protrusions each protrude toward the corresponding one of the first protrusions in the first direction.

4. The fuel cell stack according to claim 3, wherein the top wall portion, the side wall portions, and the step portion of each first protrusion are defined as a first top wall portion, first side wall portions, and a first step portion, respectively each of the second protrusions includes a second top wall portion and two second side wall portions located on opposite sides of the second top wall portion in the second direction, and at least one of the two second side wall portions includes a second step portion having a shape of a step in the first direction.

5. The fuel cell stack according to claim 3, wherein the second protrusions are provided over an entire range in which the groove passages are formed in the second direction.

6. The fuel cell stack according to claim 1, wherein each of the first protrusions extends longer in the third direction than in the second direction.

7. The fuel cell stack according to claim 6, wherein each single cell has a rectangular plate-shape as a whole, the second direction corresponding to a longitudinal direction of the single cell.

8. The fuel cell stack according to claim 7, wherein the first separator has a rectangular shape in plan view, the first separator having two long sides extending in the second direction, of the groove passages, the groove passages that are located at the outermost positions in the third direction are referred to as outer-side groove passages, and each of the first protrusions is arranged between one of the outer-side groove passages and a corresponding one of the two long sides.

9. The fuel cell stack according to claim 6, wherein each single cell further includes a frame member that holds the power generating unit, and in each single cell, the first separator and the second separator hold the power generating unit and the frame member between the first separator and the second separator.

10. The fuel cell stack according to claim 1, wherein each single cell has a rectangular plate-shape as a whole, the second direction corresponding to a longitudinal direction of the single cell.

11. The fuel cell stack according to claim 10, wherein the first separator has a rectangular shape in plan view, the first separator having two long sides extending in the second direction, of the groove passages, the groove passages that are located at the outermost positions in the third direction are referred to as outer-side groove passages, and each of the first protrusions is arranged between one of the outer-side groove passages and a corresponding one of the two long sides.

12. The fuel cell stack according to claim 10, wherein each single cell further includes a frame member that holds the power generating unit, and in each single cell, the first separator and the second separator hold the power generating unit and the frame member between the first separator and the second separator.

13. The fuel cell stack according to claim 1, wherein each single cell further includes a frame member that holds the power generating unit, and in each single cell, the first separator and the second separator hold the power generating unit and the frame member between the first separator and the second separator.

* * * * *